United States Patent [19]

Lenz et al.

[11] Patent Number: 5,128,191
[45] Date of Patent: Jul. 7, 1992

[54] FLEXURALLY STRONG COMPONENT

[75] Inventors: Werner Lenz, Ludwigshafen; Alfred Pirker, Frankenthal; Wolfgang Seib, Dannstadt-Schauernheim, all of Fed. Rep. of Germany

[73] Assignee: BASF Aktiengesellschaft, Ludwigshafen, Fed. Rep. of Germany

[21] Appl. No.: 677,892

[22] Filed: Apr. 1, 1991

[30] Foreign Application Priority Data

Apr. 10, 1990 [DE] Fed. Rep. of Germany ....... 9004148

[51] Int. Cl.5 .......................... B32B 3/12; B32B 3/26; B32B 3/30
[52] U.S. Cl. ..................................... 428/116; 428/122; 428/167; 428/188; 428/304.4; 428/319.1
[58] Field of Search ............... 428/116, 122, 167, 188, 428/304.4, 319.1

[56] References Cited

U.S. PATENT DOCUMENTS 4,931,339  6/1990  Malcom-Brown ................. 428/122

FOREIGN PATENT DOCUMENTS 2824906 12/1979 Fed. Rep. of Germany ... 428/319.1

*Primary Examiner*—William J. Van Balen
*Attorney, Agent, or Firm*—Keil & Weinkauf

[57] ABSTRACT

The component comprises an elongate structure (1) with an open cross-section and edge stiffening elements (2); to increase the shear stiffness or bulge resistance of the structure (1), its flanges (3) are stiffened in the deformation-critical areas with plates or shells (4) attached to the flanges by means of spacer elements (7-9).

4 Claims, 2 Drawing Sheets

FLEXURALLY STRONG COMPONENT

The present invention relates to a flexurally strong plastic component comprising an elongate structure of open cross-section with edge stiffening elements.

Structural components of the aforementioned kind frequently have U-shaped cross-sections and are usually used as supports in a wide variety of areas, for example for automotive bumpers As will be known, the shear stiffness or bulge resistance and critical dent load of open profiles are lower than those of closed profiles, which are more difficult to manufacture. And it is important to assign a lower value to the critical dent load of the plastics used, since the customary metals have a comparatively higher modulus of elasticity.

Known ways of increasing the shear stiffness or bulge resistance and critical dent load of such components are thicker walls or reinforcing ribs. However, these measures have the disadvantages of running counter to lightweight construction and being more expensive to manufacture.

It is an object of the present invention to develop a flexurally strong plastic component which, while being light in weight, is superior in shear stiffness or bulge resistance to existing components.

We have found that this object is achieved by a component of the kind described at the beginning if, according to the present invention, the flanges of the structure have been stiffened in the areas prone to denting or bulging under stress with plates or shells which are attached to the flanges by means of spacer elements.

Figure 1:
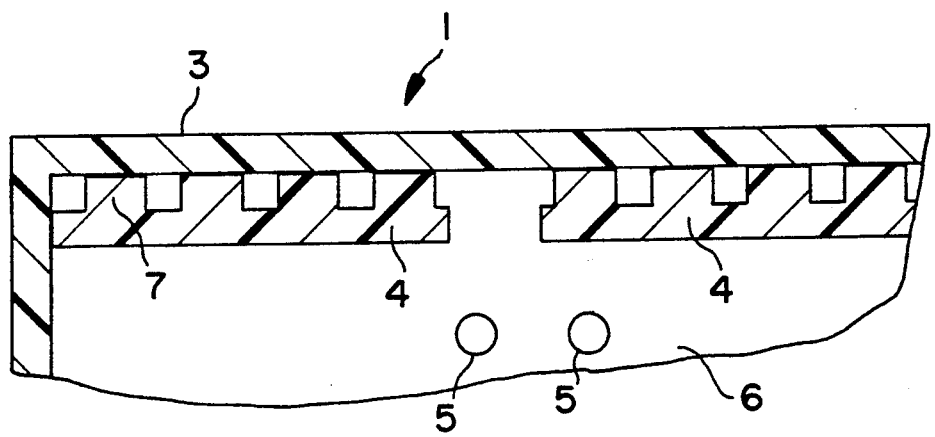

In what follows, the invention is further described with reference to a diagrammatically depicted embodiment. In the drawing FIG. 1 is a partial view of half of the component in longitudinal section, with stiffening plates and spacer ribs, and FIGS. 2-4 are each views of the component in cross-section, with stiffening plates and various spacer elements.

Figure 2:
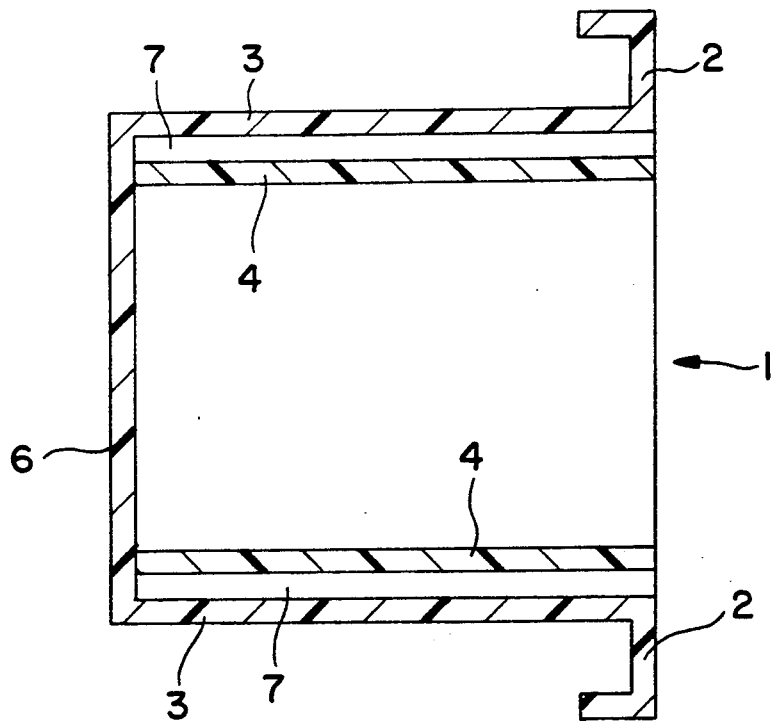
Figure 3:
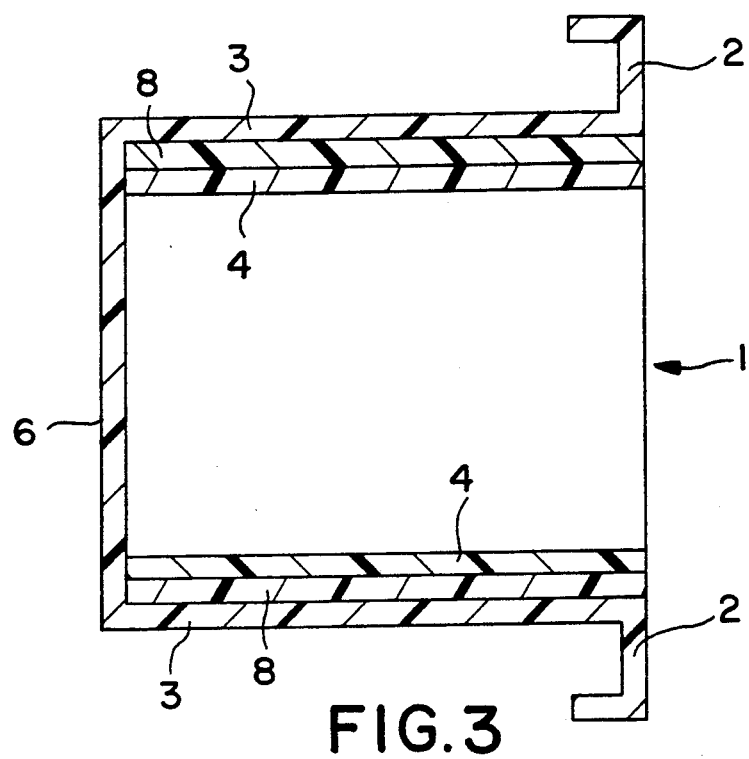
Figure 4:
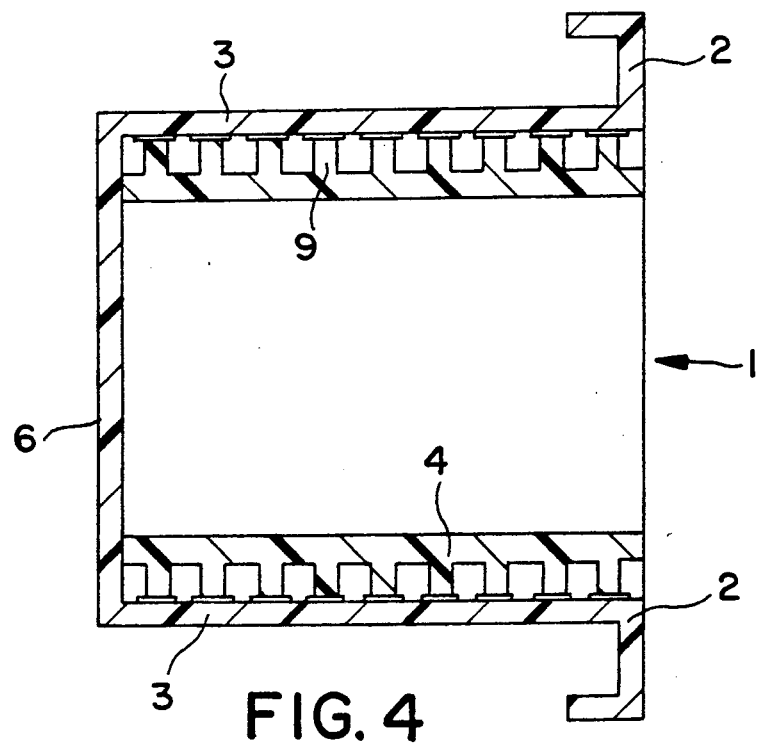

The component comprises an elongate structure 1 made of a plastic material, preferably a modified thermoplastic such as PP, PBT, PA and alloys thereof, UP materials and polyurethanes, with an open cross-section, in the present embodiment with a U-profile (FIGS. 2-4). The edge 2 at the open side of the structure is singly or doubly angled for stiffness.

The flanges 3 of the structure are reinforced to increase its shear stiffness or bulge resistance with thin plates or shells 4 in those areas in which they tend to become dented or bulge under stress. In the case of an automotive bumper, these are the areas between the fixing points 5 and outside thereof. The plates or shells 4 are bonded to the web 6 and, by means of spacer elements, to the flanges 3 of the structure 1. The bond can be produced for example by ultrasonic or vibration welding or adhering. The spacer elements, which are about 1-3 mm in thickness, can—as can be seen in the illustrative embodiments of FIGS. 1 and 2 —take the form of ribs 7 which extend transversely to the structure and which are advantageously integral with the plates or shells 4. Similarly, instead of being bonded to web 6 and flange 3 the plates or shells 4 may be integral therewith.

Instead of the ribs 7 it is also possible to provide a rigid or semirigid foam layer 8 to be introduced subsequently into the space between the flange 3 and the plates or shells 4, as shown in the representation of FIG. 3. Suitable foam materials are for example semirigid to rigid foams made of polyurethane or polypropylene.

A further embodiment of the spacer elements can take the form of a honeycomb assembly 9, for example of the abovementioned materials, integral with the plates or shells 4 and bonded to the flange 3 by ultrasonic or vibration welding or adhering (FIG. 4).

By virtue of the above-described constructional measures it is possible to significantly increase the shear stiffness or bulge resistance and hence the bending stiffness of structural components without having to increase the weight of the component. The invention thus combines flexurally stiff design options with the advantages of lightweight construction.

We claim:

1. A flexurally strong plastic component, comprising an elongate structure of open cross-section with edge stiffening elements, wherein the flanges of said structure have been stiffened in the areas prone to denting or bulging under stress with plates or shells attached to said flanges by means of spacer elements.

2. The flexurally strong component of claim 1, wherein the spacer elements are ribs extending transversely to the longitudinal extension of the structure.

3. The flexurally strong component of claim 1, wherein the spacer elements take the form of a semirigid or rigid foam layer.

4. The flexurally strong component of claim 1, wherein the spacer elements take the form of a honeycomb assembly.

* * * * *